United States Patent
Zhang et al.

(10) Patent No.: US 6,864,911 B1
(45) Date of Patent: Mar. 8, 2005

(54) LINKABLE DIGITAL CAMERAS FOR AN IMAGE CAPTURE SYSTEM

(75) Inventors: Xuemei Zhang, Mountain View, CA (US); Yingmei Lavin, Newark, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 09/696,779

(22) Filed: Oct. 26, 2000

(51) Int. Cl.⁷ .......................... H04N 15/00; H04N 5/232
(52) U.S. Cl. .......................... 348/42; 348/46; 348/211.1
(58) Field of Search .......................... 348/42, 46–48, 348/51, 52, 211.1, 211.11, 207.99, 207.1; 382/154; 345/419; 396/324; 352/57

(56) References Cited

U.S. PATENT DOCUMENTS

| | | | |
|---|---|---|---|
| 3,980,394 A | | 9/1976 | Zapf |
| 4,842,411 A | * | 6/1989 | Wood .......................... 356/603 |
| 5,612,733 A | * | 3/1997 | Flohr ....................... 348/14.16 |
| 5,778,268 A | | 7/1998 | Inaba |
| 5,794,088 A | | 8/1998 | Oehmichen |
| 5,832,325 A | | 11/1998 | Ito et al. |
| 5,835,133 A | | 11/1998 | Moreton et al. |
| 5,852,753 A | | 12/1998 | Lo et al. |
| 5,892,994 A | | 4/1999 | Inaba |
| 5,946,509 A | * | 8/1999 | Morton ......................... 396/311 |
| 5,963,369 A | | 10/1999 | Steinthal et al. |
| 6,005,613 A | * | 12/1999 | Endsley et al. ........... 348/231.6 |
| 6,067,077 A | * | 5/2000 | Martin et al. ................. 345/161 |
| 6,188,431 B1 | * | 2/2001 | Oie .......................... 348/211.5 |
| 6,271,876 B1 | * | 8/2001 | McIntyre et al. ............. 348/46 |
| 6,326,994 B1 | * | 12/2001 | Yoshimatsu .................. 348/46 |
| 6,346,965 B1 | * | 2/2002 | Toh .............................. 348/49 |
| 6,388,666 B1 | * | 5/2002 | Murray ........................ 345/473 |
| 6,516,358 B1 | * | 2/2003 | Carau et al. .................. 710/36 |
| 6,570,566 B1 | * | 5/2003 | Yoshigahara ................ 345/427 |
| 2001/0054060 A1 | * | 12/2001 | Fillebrown et al. .......... 709/201 |

FOREIGN PATENT DOCUMENTS

| | | |
|---|---|---|
| JP | 62086997 | 10/1985 |
| JP | 06030445 | 7/1992 |
| JP | 11094527 | 9/1997 |
| JP | 11355807 | 6/1998 |

OTHER PUBLICATIONS

Stereo Photography by Fritz G. Waack Total No. of pages: 48.

* cited by examiner

*Primary Examiner*—Andrew Christensen
*Assistant Examiner*—Lin Ye
(74) *Attorney, Agent, or Firm*—Trueman H. Denny, III (57) ABSTRACT

A system of linked digital cameras for an image capture system is disclosed. A first and second digital camera can be linked to capture a first images and a second image that are used to form a stereo image. A first data port on the first digital camera and a second data port on the second digital camera intercommunicate data between each other when the cameras are linked. The data can include the first and second image data, camera control data, and camera synchronization data. After capturing the first and second images, the image from one of the cameras can be transferred to the other camera so that both the first and second images reside in the other camera. The system allows a user who wishes to capture stereo images the ability to do so with out having to purchase two digital cameras. A compatible digital camera can be borrowed from another user for the purpose of stereo image capture. After the stereo image is captured, the user transfers both images to his camera and returns the borrowed camera. The cameras can be equipped with viewfinders that allow a user of the cameras to view the image being captured in stereo. The viewfinders can be adjustable to accommodate variations in user interpupillary distance. A digital camera operating system (OS) can be customized to enable stereo image capture, image data handling, image processing, and camera control for the linked digital cameras.

24 Claims, 7 Drawing Sheets

LINKABLE DIGITAL CAMERAS FOR AN IMAGE CAPTURE SYSTEM

BACKGROUND OF THE INVENTION

The present invention relates generally to linkable digital cameras that form an image capture system. More specifically, the present invention relates to linkable digital cameras that together form a stereo image capture system.

BACKGROUND ART

Stereo film cameras have been around for a long time. Typically, a stereo film camera includes two side-by-side lenses that are adapted to focus images onto two adjacent imaging areas on a negative film strip. Designs for stereo film cameras include a dedicated stereo film camera in which both lenses are mounted to a common chassis (i.e. two film cameras in one chassis). The dedicated stereo film camera can also include a stereo view finder so that a user of the camera can stereoscopically view an image to be captured by the camera. Another type of stereo film camera includes two individual film cameras (dual cameras) that are either physically connected to each other or are fixedly positioned relative to each other on a platform. With either arrangement, the goal is to have the lenses of the dual camera spaced apart and the optical axes of the lens aligned so that a stereo image of correct disparity is produced. Additionally, the dual cameras can include view finders that are positioned so that a stereo image to be captured can be viewed stereoscopically by a user of the dual cameras.

The aforementioned dedicated stereo film camera can also be mimicked by a dedicated stereo digital camera. However, such a design would require two image sensors arrays, which would increase both the cost and the power consumption of the stereo digital camera. Moreover, the extra sensor array will be wasted if a user of the stereo digital camera does not need to capture a stereo image. Another disadvantage of the stereo digital camera is that the extra lens, the extra image sensor array, the extra electronics, and the extra stereo viewfinder add to the weight and size of the camera. Consequently, the user of the stereo digital camera must contend with the cameras added weight and bulk even though the user may only desire to occasionally capture stereo images.

On the other hand, the dual cameras mentioned above can also be mimicked by using two individual digital cameras (dual digital cameras). One disadvantage to using dual digital cameras is that a user desiring to capture stereo images may have to buy two digital cameras. The cost of purchasing two digital cameras can be prohibitive to many users. Furthermore, for a user who desires to occasionally capture stereo images, the purchase of two digital cameras is not practical. Other disadvantages to dual digital cameras include: extra hardware may be needed to position the lenses of the camera so that a stereo image can be captured; dual digital cameras that are not designed for stereo image capture may not allow for the view finders of the cameras to be positioned for stereoscopically viewing the image to be captured; critical camera functions such as synchronizing of the shutters and other functions such as lens focus, zoom, exposure control, image file management, and flash synchronization may not be possible or easily accomplished with dual digital cameras; the hardware for positioning the dual digital cameras may be bulky and time consuming to setup; and images captured by the dual digital cameras must be individually downloaded from each camera.

Therefore, there is a need for an image capture system that is adapted to capture stereo images without the cost, size, and weight of the dedicated stereo digital camera and that eliminates the cost, inconvenience, image file management, and operational difficulties of dual digital cameras.

SUMMARY OF THE INVENTION

The above mentioned needs are met by the image capture system of the present invention. The problems and disadvantages of the dedicated stereo digital camera and of the dual digital cameras are solved by an image capture system that allows two compatible digital cameras to be snapped onto each other (linked) to take stereo pictures.

Advantages of the image capture system of the present invention include the ability to independently capture non-stereo images using a single digital camera;

however, for a user who wishes to take stereo pictures, the user can either purchase two compatible digital cameras and snap them together, or more preferably, the user can borrow a compatible digital camera from a friend, a nearby tourist, or rent one provided by a venue such as a camera store, a park, or a tourist attraction. The image information from the borrowed digital camera can be transferred to the users digital camera via a data link between the cameras. Consequently, the extra image sensor array of the borrowed digital camera is not wasted when the user does not need to take a stereo picture. On the other hand, for a user who does not want to take stereo pictures, a single digital camera is all that user needs and is all that user has to purchase.

Broadly, the present invention is embodied in an image capture system that includes first and second digital cameras that can be snapped together (linked). When the cameras are linked, data ports on each camera are in communication with each other. Additionally, when the cameras are linked, optical axes of both cameras are spaced apart by a predetermined distance and are positioned substantially coplanar and substantially parallel to each other so that a stereo image of correct disparity can be captured by capturing a first image with the first digital camera and capturing a second image with the second digital camera. The image from the second digital camera can be transferred to the first digital camera or vise-versa via the data ports. Additionally, camera functions on the first and second digital cameras including synchronization of the shutters, focus, flash, and zoom, to name a few, can be controlled by either one of the cameras.

In one embodiment of the present invention, when the cameras are linked, the data ports are in electrical communication with each other. In another embodiment, the data ports are in wireless communication with each other when the cameras are linked.

In another embodiment of the present invention, the first and second digital cameras include first and second view finders respectively. When the cameras are linked, the view finders are spaced apart by an interpupillary separation so that the view finders provide a visual stereo image that is representative of the stereo image captured by the first and second digital cameras. Optionally, the viewfinders can be movably mounted on their respective digital cameras so that the interpupillary separation can be adjusted to accommodate user specific variations in eye spacing.

Other aspects and advantages of the present invention will become apparent from the following detailed description, taken in conjunction with the accompanying drawings, illustrating by way of example the principles of the present invention.

DETAILED DESCRIPTION

In the following detailed description and in the several figures of the drawings, like elements are identified with like reference numerals.

As shown in the drawings for purpose of illustration, the present invention is embodied in an image capture system that includes first and second digital cameras that can be linked with each other. The first digital camera including a first optical axis and a first data port and the second digital camera including a second optical axis and a second data port. When the cameras are linked, the data ports on each camera can be in communication with each other such that data can be intercommunicated between the first and second digital cameras via the first and second data ports. Additionally, when the cameras are linked, the optical axes of both cameras are spaced apart by a predetermined distance and are positioned substantially coplanar and substantially parallel to each other so that a stereo image of correct disparity can be captured by capturing a first image with the first digital camera and capturing a second image with the second digital camera. The image from the second digital camera can be transferred to the first digital camera or vise-versa via the data ports. Additionally, camera functions on the first and second digital cameras including shutter synchronization, flash synchronization, synchronization of focus and/or zoom, to name a few, can be controlled by either one or both of the digital cameras.

Figure 1:
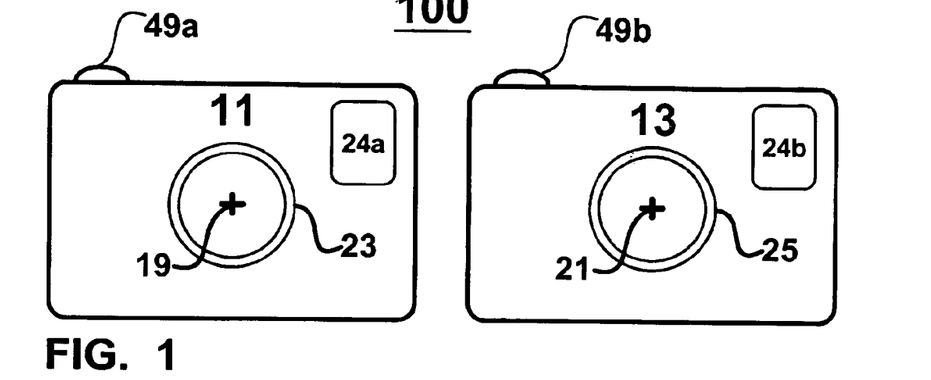
FIG. 1 is front plan view of a first digital camera and a second digital camera according to the present invention.
Figure 2:
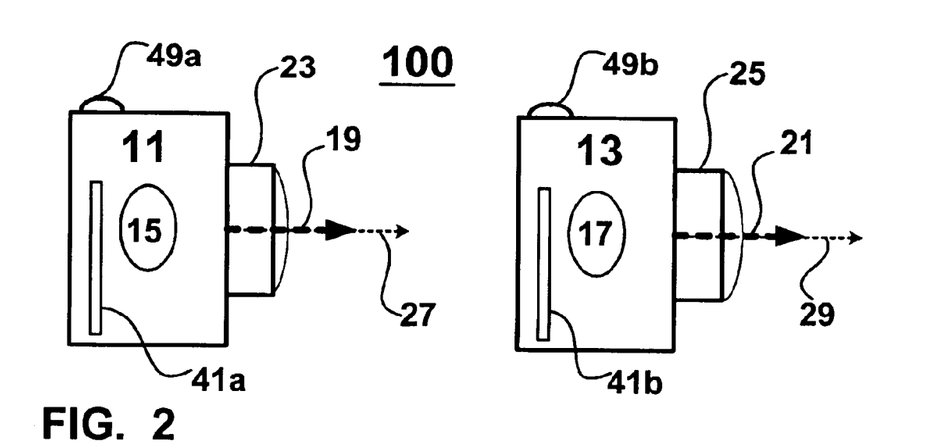
FIG. 2 is a side plan view of the first and second digital cameras of FIG. 1.
Figure 3:
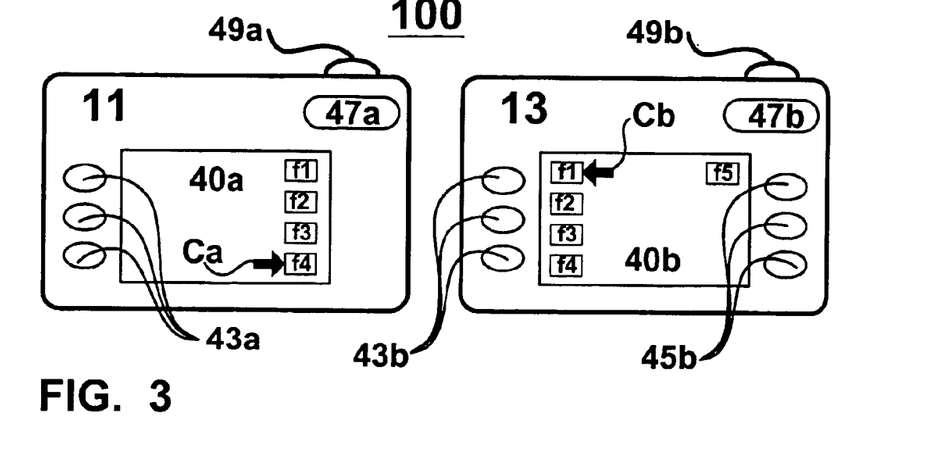
FIG. 3 is a rear plan view of the first and second digital cameras of FIG. 1.
Figure 8A:
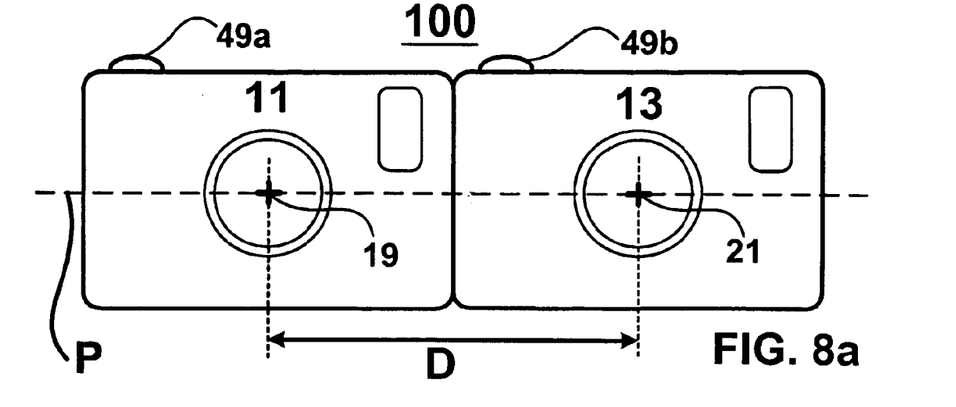
FIGS. 8a and 8b are front and top plan views of the first and second digital cameras illustrating the planar and parallel relationship between a first optical axis and a second optical axis according to the present invention.
Figure 8B:
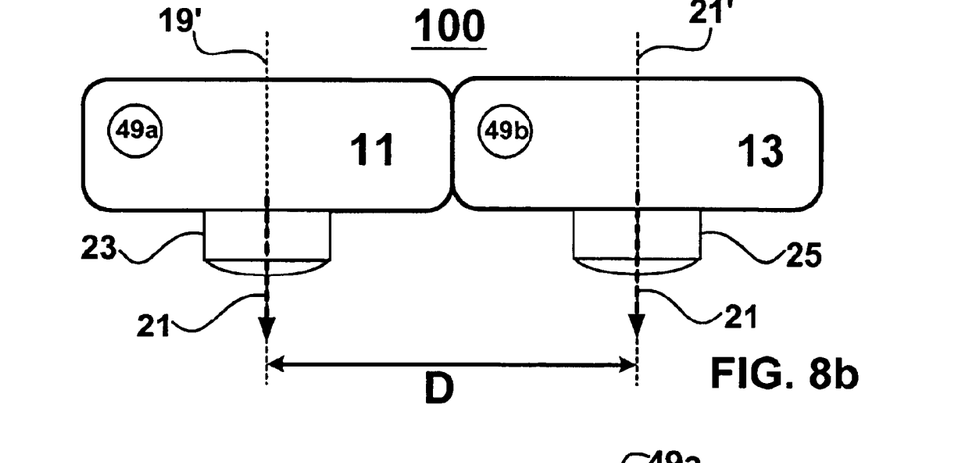

In FIGS. 1 through 3, a stereo image capture system 100 includes a first digital camera 11 and a second digital camera 13. The first digital camera 11 includes a first data port 15 and a first optical axis 19. The second digital camera 13 includes a second data port 17 and a second optical axis 21. The first and second data ports (15, 17) are adapted to intercommunicate data between the first and second digital cameras (11, 13). The first and second digital cameras (11, 13) are adapted to be linked with each other so that the first optical axis 19 and the second optical axis 21 are coplanar with each other and are parallel to each other as illustrated in FIGS. 8a and 8b. For purposes of illustration, the cross +, indicates that the first and second optical axis (19, 21) are into the drawing page. In FIG. 8a, the first digital camera 11 is linked to the second digital camera 13 and the first and second optical axes (19, 21) are coplanar with each other as illustrated by a dashed line P through the first and second optical axes (19, 21). When the first and second digital cameras (11, 13) are linked, the first and second optical axes (19, 21) are also separated by a predetermined distance D. Moreover, the first and second optical axes (19, 21) are parallel to each other as illustrated by the dashed lines 19' and 21' through the first and second optical axes (19, 21) respectively in FIG. 8b. Although FIGS. 8a and 8b illustrate the first and second digital cameras (11, 13) being linked by connecting them along side portions of the digital cameras (i.e. side-to-side), the manner in which the first and second digital cameras (11, 13) can be linked with each other is not limited to the arrangements illustrated herein. Preferably, the first and second digital cameras (11, 13) are linked by connecting them with each other in an arrangement that positions the first and second optical axes (19, 21) in a coplanar and parallel relationship with each other and spaces them apart by the predetermined distance D as described above.

The first digital camera 11 is operative to capture a first image and the second digital camera 13 is operative to capture a second image. Consequently, when the first and second digital cameras (11, 13) are linked, a stereo image is captured by capturing the first and second images. Typically, the first and second digital cameras (11, 13) will include a lens 23 and 25 respectively and the lenses (23, 25) will have optical axes 27 and 29 respectively that are coaxial with the first and second optical axes (19, 21). Because the first and second digital cameras (11, 13) are designed to be used as a normal digital camera when they are not linked (with each other, the first and second digital cameras (11, 13) can include features and functions common to a digital camera such as a slot (41a and 41b) for inserting a memory card or a disk for data storage, control buttons (43a, 43b, 45b, 47a, and 47b), a shutter button (49a and 49b), and a flash (24a and 24b) (strobe hereinafter).

The first and second digital cameras (11, 13) need only be compatible with each other for the purpose of capturing stereo images. Therefore, the first and second digital cameras (11, 13) can be identical digital camera models or they can be different digital camera models. For instance, one of the digital cameras can have more functions/features than the other digital camera. However, the focal length (f) and the lens speed (f:) of the lenses (23, 25) should be as identical as possible. Preferably, the focal length (f) and the lens speed (f:) are identical for the lenses (23, 25).

FIG. 3 illustrates that the second digital camera 13 can include additional control buttons 45b that are not found on the first digital camera 11. Additionally, the first and second digital cameras (11, 13) can include a display 40a and 40b that can be used for displaying a first image 7 and a second image 9 (see FIG. 5b). The displays (40a, 40b) can also display a graphical user interface (GUI) for controlling some or all of the cameras functions using a cursor (Ca, Cb) or the like to select various functions such as f1, f2, f3, f4 on the display 40a (selectable by the cursor Ca) and f1, f2, f3, f4, f5 on the display 40b (selectable by the cursor Cb) that are displayed as graphical images (icons) on the displays (40a, 40b). The GUI can also display menus (not shown) on the displays (40a, 40b). For instance, the control buttons 47a and 47b can be used to move their respective cursors (Ca, Cb) to a position on the displays (40a, 40b) to make a selection of any one or more of the aforementioned functions (f1, f2, f3, f4, f5). The cursor Ca is positioned to select the function f4 and the cursor Cb is positioned to select the function f1. A custom operating system (OS) can be used to display icons for the GUI and to control the first and second digital cameras (11, 13) as will be described below.

Figure 9:
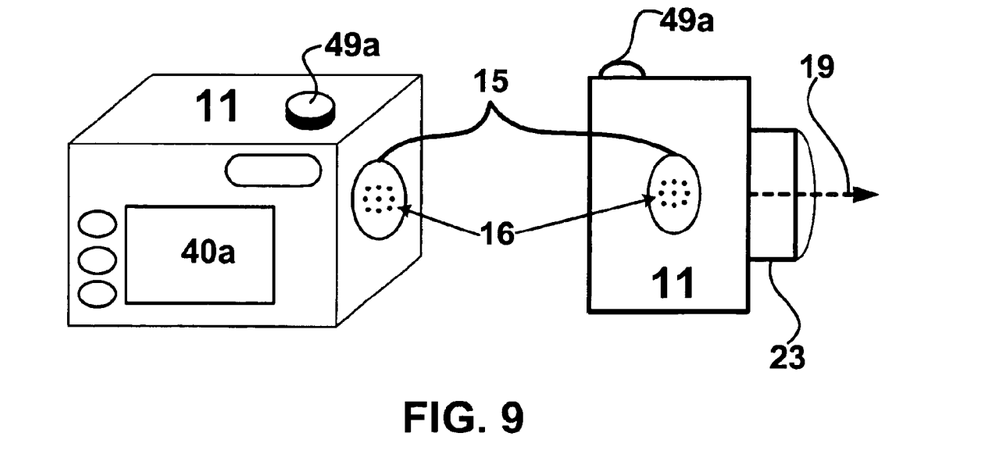
FIG. 9 is a rear profile view and a side view of a data port according to the present invention.

In one embodiment of the present invention, data is intercommunicated between the first and second data ports (15, 17) when the first and second digital cameras (11, 13) are linked with each other. Once linked, the first data port 15 is in communication with the second data port 17. If the communication is by electrical signals, then the first data port 15 is in electrical communication with the second data port 17 when the first and second digital cameras (11, 13) are linked. Electrical communication can be effectuated using electrically conductive pins or the like as illustrated by electrical connections 16 and 18 in FIGS. 9 and 10. On the other hand, if the communication is by light signals, then the first data port 15 is in optical communication with the second data port 17 when the first and second digital cameras (11, 13) are linked. Preferably, the first and second digital cameras (11, 13) are designed so that when they are linked to each other, the first data port 15 is positioned adjacent to the second data port 17 and the first and second data ports (15, 17) are in facing relation to each other. If the communication is by radio waves, then the first and second data ports (15, 17) need not be adjacent to each other or in facing relation to each other, although they can be.

Figure 4A:
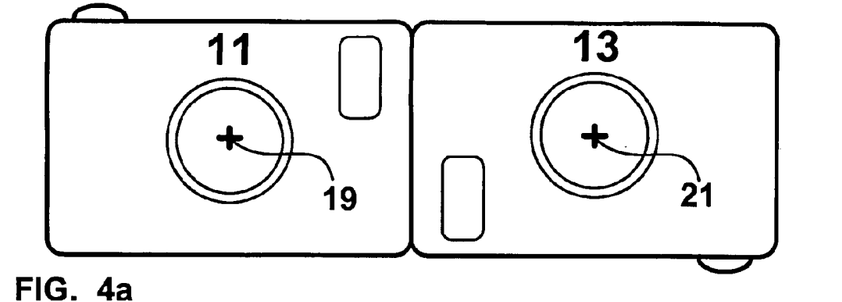
FIGS. 4a and 4b are front and rear plan views respectively of the first and second digital cameras in a side-to-side linked configuration in which one of the cameras is flipped according to the present invention.
Figure 4B:
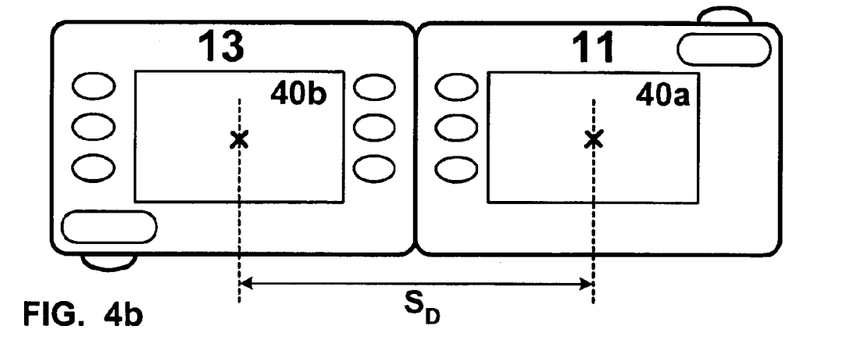

Reference is now made to FIGS. 2, 4a, and 4b in which the first and second data ports (15, 17) are on the same side of the first and second digital cameras (11, 13) as illustrated in FIG. 2. In order for the first and second data ports (15, 17) to be in communication with each other, the second digital camera 13 is flipped from a normal position as illustrated in FIGS. 1 and 3 to a linked position (side-to-side) as illustrated in FIGS. 4a and 4b. On the other hand, the first digital camera 11 could be flipped from the normal position to the linked position. In the embodiment illustrated in FIGS. 4a and 4b and in other embodiments to be described herein, the first and second digital cameras (11, 13) are designed so that when they are linked the first optical axis 19 and the second optical axis 21 are substantially coplanar with each other and are substantially parallel to each other as illustrated in FIGS. 8a and 8b.

Figure 5A:
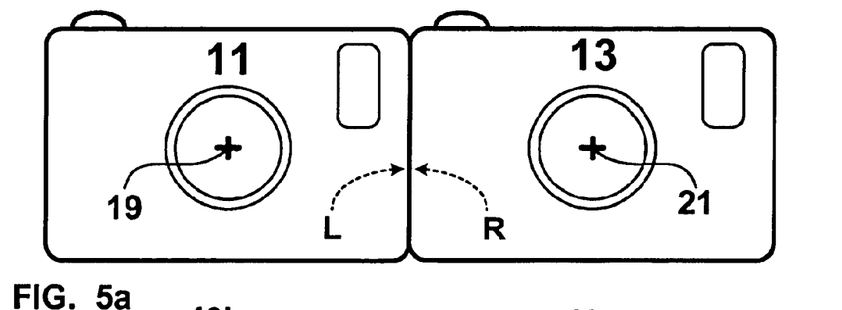
FIGS. 5a and 5b are front and rear plan views respectively of the first and second digital cameras in a side-to-side linked configuration according to the present invention.
Figure 5B:
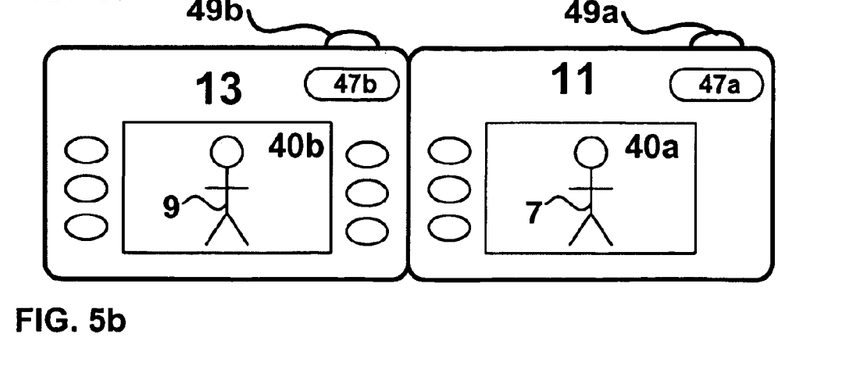

In another embodiment of the present invention, as illustrated in FIGS. 5a and 5b, the first and second data ports (15, 17) are on opposite sides of the first and second digital cameras (11, 13). For example, the first data port 15 can be on the left side (dashed arrow L) of the first digital camera 11 and the second data port 17 can be on the right side (dashed arrow R) of the second digital camera 13 or vice versa. However, that arrangement of the data ports would require a user of the first digital camera 11 to find another digital camera having its data port on the right side R. Similarly, a person have the second digital camera 13 with the data port on the right side R would require a digital camera with the data port on the left side L. In either case, even though the above arrangement allows for stereo image capture, it could be inconvenient for many users.

Figure 10:
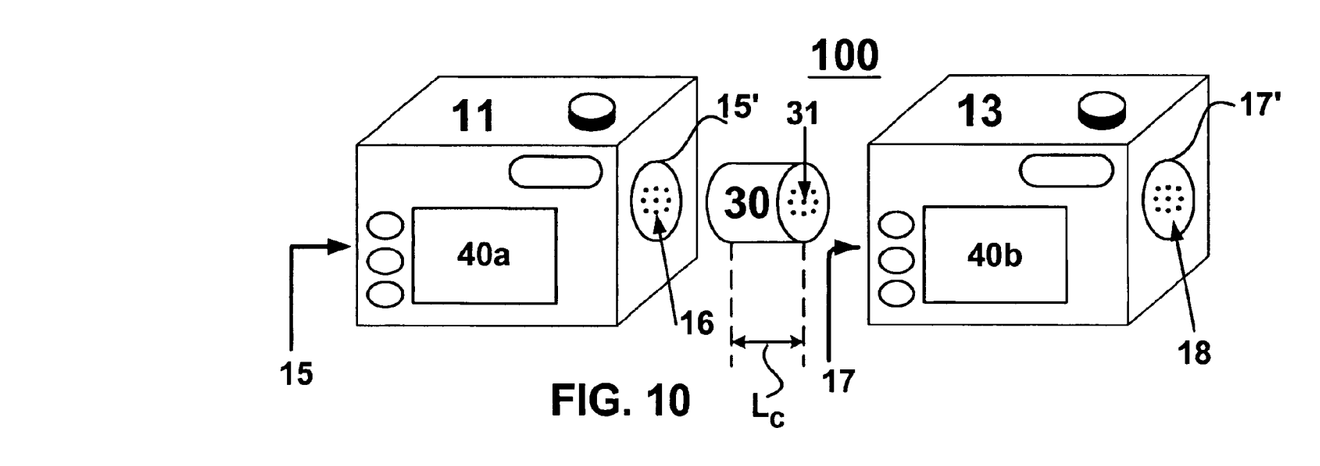
FIGS. 10 and 11 are rear profile views of a data port connector for linking the the first and second digital cameras according to the present invention.
Figure 11:
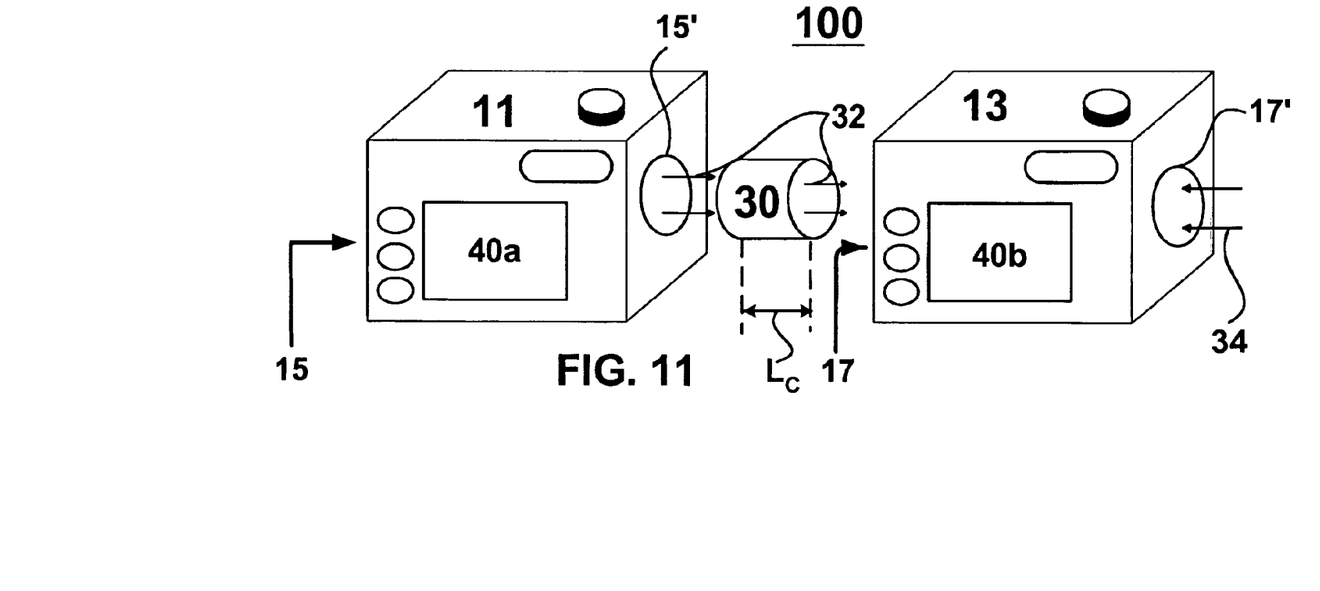

Therefore, in yet another embodiment of the present invention, as illustrated in FIGS. 10 and 11, the first data port 15 of the first digital camera 11 is replicated 15' at least once, and the second data port 17 of the second digital camera 13 is also replicated 17' at least once. For instance, the first and second data ports (15, 17) can be on the left side of the first and second digital cameras (11, 13) and the replicated data ports (15', 17') can be on the right side of the first and second digital cameras (11, 13) as illustrated in FIGS. 10 and 11, where data port 15' communicates with data port 17. The positions of the data ports (15, 15', 17, 17') are not to be construed as being limited to the left and right sides of the first and second digital cameras (11, 13). Other positions are possible. For example, the data ports (15, 15', 17, 17') can be positioned on the tops and bottoms of their respective digital cameras. The advantage to this embodiment of the present invention is that it allows the first and second digital cameras (11, 13) to be linked without having to flip either digital camera or having to find another camera with its data port on the correct side for linking.

Figure 6A:
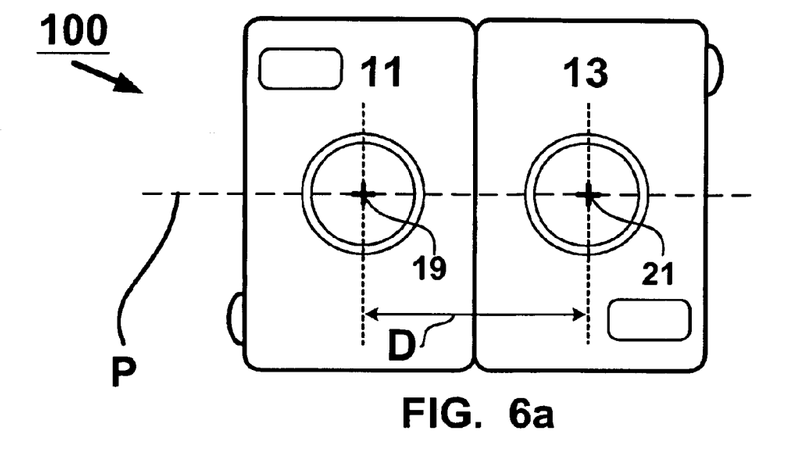
FIGS. 6a and 6b are front and rear plan views respectively of the first and second digital cameras in a bottom-to-bottom linked configuration according to the present invention.
Figure 6B:
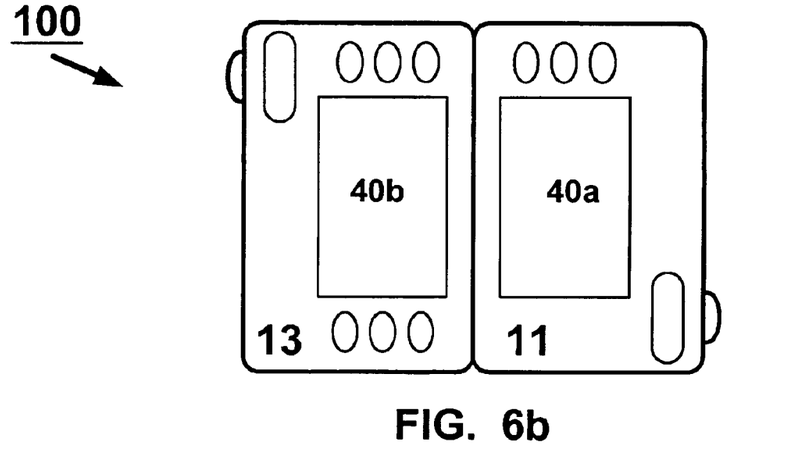
Figure 7:
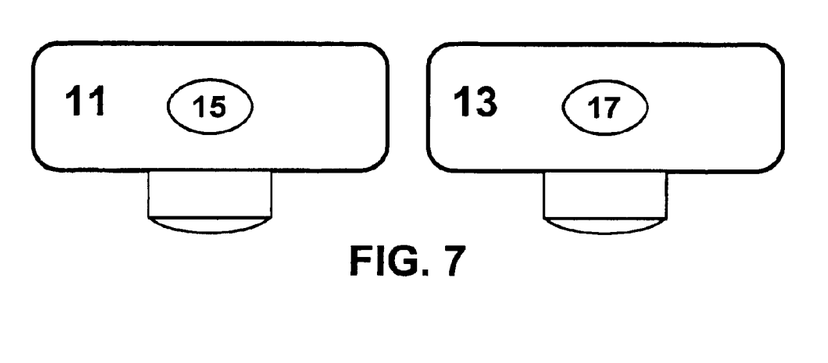
FIG. 7 is a bottom plan view of a first data port and a second data port positioned on a bottom portion of the first and second digital cameras according to the present invention.

In one embodiment of the present invention, as illustrated in FIGS. 6a, 6b, and 7, the first and second data ports (15, 17) are positioned on a bottom portion of their respective first and second digital cameras (11, 13) so that the first and second digital cameras (11, 13) can be linked along the bottoms of the cameras (i.e. a bottom-to-bottom linking) as illustrated in FIGS. 6a and 6b. The first and second data ports (15, 17) can be replicated at least once as described above. For example replicated ports 15' and 17' can be located on a top portion (not shown) of the first and second digital cameras (11, 13) for a top-to-top linking.

Reference is now made to FIGS. 10 and 11 in which the system 100 includes a data port connector 30 for linking the first digital camera 11 with the second digital camera 13 and for connecting the first data port 15 with the second data port 17. The data port connector 30 has a fixed length $L_c$. The first and second digital cameras (11, 13) can be linked with or without the data port connector 30. Moreover, the data port connector 30 can be used in situations in which it is desirable to increase the predetermined distance D. Typically, for stereo image capture, the predetermined distance D is about 55.0 millimeters. However, depending on the physical dimensions of the first and second digital cameras (11, 13), the predetermined distance D may be less than 55.0 millimeters when the cameras are linked without the data port connector 30. The data port connector 30 can be used to increase the predetermined distance D to 55.0 millimeters. The data port connector 30 can be manufactured in different lengths so that the predetermined distance D can be increased by selecting the data port connector 30 having a longer length $L_c$.

On the other hand, for capturing close-up stereo images, for example, the predetermined distance D can be decreased by selecting the data port connector 30 having a shorter length $L_c$ or by removing the data port connector 30 to reduce the predetermined distance D to less than 55.0 millimeters. For example, a separation of about 18.0 millimeters to about 36.0 millimeters for the predetermined distance D can be used for close-up stereo image capture. Therefore, the first and second digital cameras (11, 13) when linked without the data port connector 30 may have dimensions that are suited for close-up stereo image capture.

The data port connector 30 can include electrical conductors 31 for electrically communicating data from the electrical connections 16 on data port 15' to the electrical connections 18 of the data port 17 as illustrated in FIG. 10. However, if the intercommunication of data is by wireless means such as visible or infrared light, then the data port connector 30 can have a hollow inner portion that allows the wireless data (light or radio) to pass from the data port 15' to the data port 17 as illustrated in FIG. 11. An optical system (not shown) can be included in the data port connector to focus or channel light between the data ports (15', 17).

Figure 12A:
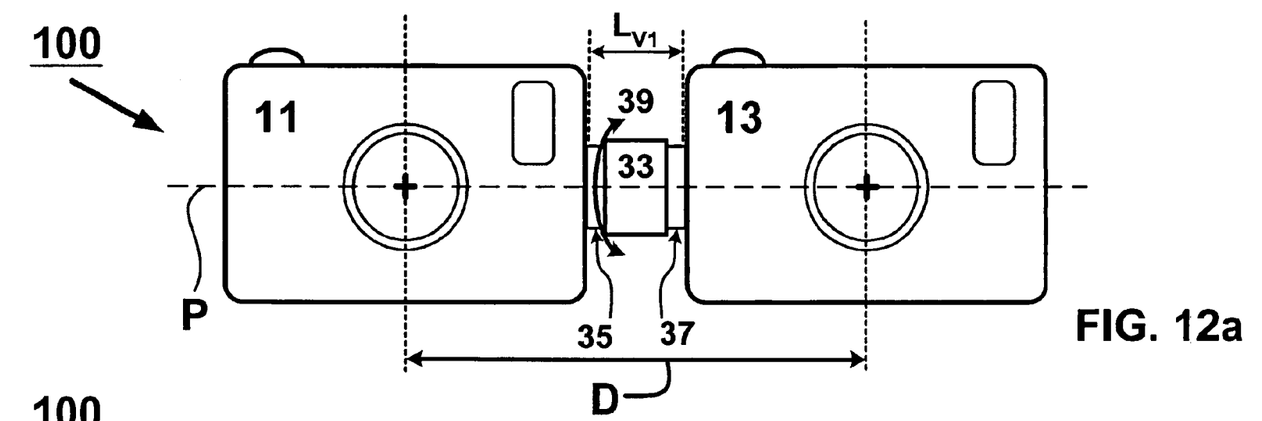
FIGS. 12a and 12b are front plan views illustrating an adjustable length data port connector for linking the first and second digital cameras according to the present invention.
Figure 12B:
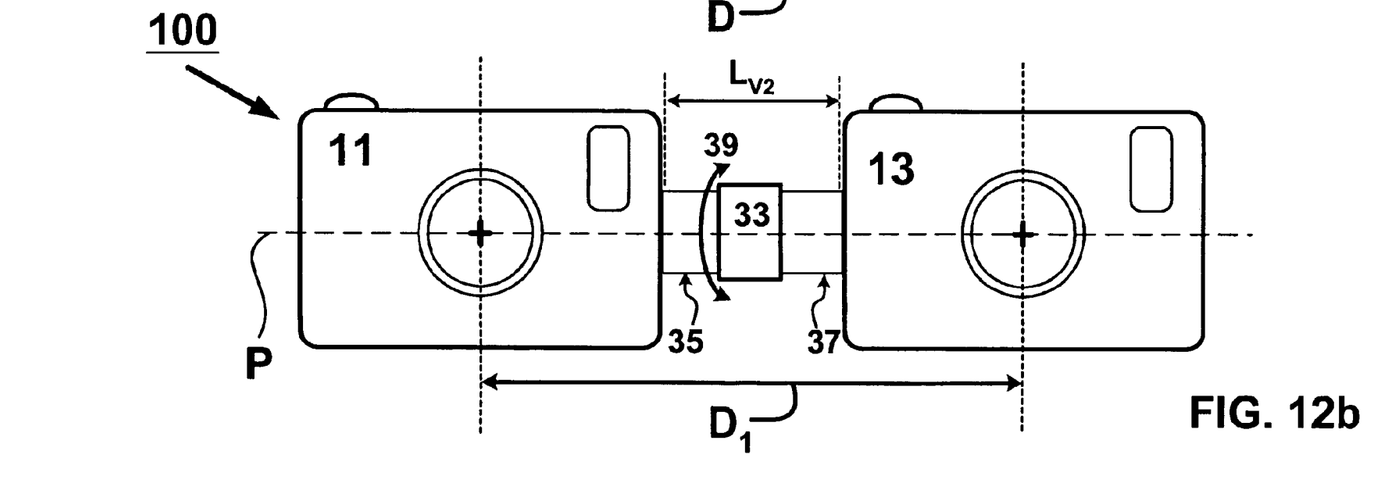

In another embodiment of the present invention, as illustrated in FIGS. 12a and 12b, a data port connector 33 having an adjustable length is used for connecting the first digital camera 11 with the second digital camera 13 and for connecting the first data port 15 with the second data port 17. The data port connector 33 can have a first segment 35 that connects with the data port 15 of the first digital camera 11 and a second segment 37 that connects with the data port 17 of the second digital camera 13. For instance, the data port connector 33 can be twisted 39 to cause the first and second segments (35, 37) to telescope inward or outward such that a first length $L_{V1}$ can be increased to a second length $L_{V2}$ or vice-versa. Accordingly, the predetermined distance D is increased to $D_1$. Therefore, one possible use for the data port connector 33 is to vary the predetermined distance D according to a user needs. For example, the data port connector 33 can be used to set the predetermined distance D to about 55.0 millimeters for normal stereo image capture and then the data port connector 33 can be adjusted to decrease the predetermined distance D for close-up or macro stereo image capture. In one embodiment of the present invention, the data port connector 33 adjusts the predetermined distance D in a range from about 18.0 millimeters to about 80.0 millimeters.

In one embodiment of the present invention, the data is electrically intercommunicated between the first and second data ports (15, 17) using a communication protocol. The communication protocol can be a custom or a proprietary protocol developed specifically for use by the stereo image capture system 100. Preferably, the communication protocol is based on a well accepted communication protocol for the following reasons. First, when the digital cameras are not linked, the protocol allows for easy data transfer between the camera and peripherals that can interface with the camera, such as printers and personal computers (PC). Second, there is an established hardware, software, device driver, and skill base for the protocol that can be leveraged for use in the stereo image capture system 100. Finally, most digital cameras include a data port that communicates data using a well accepted communications protocol that consumers are accustomed to working with and digital camera designers are familiar with.

The communication protocol can be a JETSEND™ protocol, an IEEE 1394 protocol, a FIREWIR™ protocol, an USB protocol, a RS-232 protocol, or a RS422 protocol. The choice of protocol will be application specific and can be determined by factors that include but are not limited to implementation costs, the desired speed of data transfer, ease of use, cable requirements such as cable type and length, and the variety and types of peripherals to be interfaced with.

In another embodiment of the present invention, the first and second data ports (15, 17) are in wireless intercommunication with each other when the first and second digital cameras are linked. The wireless intercommunication can be an optical intercommunication or a radio intercommunication. For optical intercommunication, the first and second data ports (15, 17) can include a transceiver that transmits and receives light in the visible or the infrared spectrum. Preferably the infrared spectrum is used to communicate the data. A communication protocol such as the IRDA™ communication protocol or the JETSEND™ communication protocol can be used to intercommunicate the data. The above mentioned transceiver can be an IRDA compliant infrared transceiver. For example, an AGILENT™ Technologies IRDA compliant transceiver such as a HDSL-3202 can be used for the first and second data ports (15, 17).

For radio intercommunication, the first and second data ports (15, 17) can include a radio transceiver that transmits and receives radio waves. The portion of the radio spectrum allocated for use in handheld and consumer appliances can be used for the radio transceiver. For instance the 900 MHz band or the GHz band can be used. A communication protocol including the BLUETOOTH™ communication protocol can be used to intercommunicate the data. Depending on the radiation pattern of an antenna used to transmit and receive the data, it may not be necessary for the first and second data ports (15, 17) to be connected with one another or be adjacent to and in facing opposition to each other when the data is communicated using radio waves so long as the radio signal from one of the data ports can be received by the other data port.

Advantages to wireless communication include the elimination of cables, connectors, and the like, to interface the first and second data ports (15, 17) with each other or with peripheral equipment such as printers and PC's. Additionally, the first and second digital cameras (11, 13) can be remotely controlled using the wireless resources in the first and second data ports (15, 17). For instance an infrared or radio based remote control can be used to control either one or both of the first and second digital cameras (11, 13). For optical intercommunication, it may be necessary to have at least one replicated port in order for the remote control to have access to a data port (i.e. access to an unblocked data port).

In another embodiment of the present invention, either one or both of the first and second data ports (15, 17) is adapted to receive extrinsic data transmitted from a source external to either one of the first and second digital cameras. The external source can transmit optically or by radio wave. The extrinsic data is used by either one or both of the first and second digital cameras (11, 13) to control one or more functions of the cameras such a exposure control, flash, and shutter speed just to name a few. In one embodiment, the extrinsic data comprises illumination data. For instance, a user of the system 100 enters a venue such as a theme park, a museum or a national park, then illumination information specific to that venue is beamed to the first and second digital cameras (11, 13) via the first and second data ports (15, 17). The first and second digital cameras (11, 13) may or may not be linked when the extrinsic data is beamed to them. The illumination information can be used for exposure control to improve images captured at the venue or to correct the images taken at the venue by post processing the image using the illumination information to improve/correct the captured image. PC software for manipulating digital images can be used to post process the captured images based on the illumination information. Although the electrical communication protocols described above could also be used to receive the illumination information, the user would need to use a cable to interface the system 100 with the extrinsic source of data. Consequently, in a crowded or busy venue, the time required to fetch the cable, connect the cable, download the illumination information, and then disconnect the cable may prove to be to time consuming. Therefore, wireless communication provides the most efficient way to covey the illumination information to the system 100.

Figure 13:
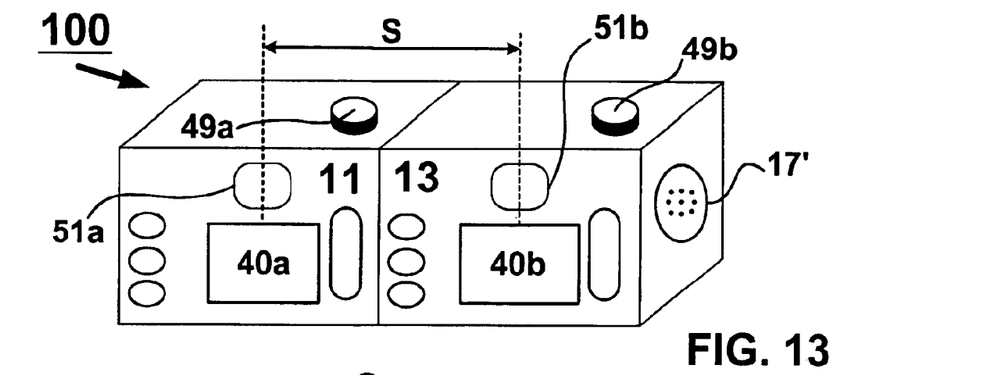
FIG. 13 is a rear profile view of linked first and second digital cameras that include viewfinders according to the present invention.

In one embodiment of the present invention, as illustrated in FIG. 13, the system 100 further includes a first view finder 51*a* mounted on the first digital camera 11 and second view finder 51*b* mounted to the second digital camera 13. The first and second view finders (51*a*, 51*b*) are spaced apart by an interpupillary separation S (also called an interpupillary distance) when the first and second digital cameras (11, 13) are linked with each other. The first and second view finders (51*a*, 51*b*) are adapted to form a visual stereo image that is a representation of the stereo image captured by the first and second digital cameras (11, 13). The first and second view finders (51*a*, 51*b*) can be an optical view finder that uses its own optical system to form an image in the eyes of a user, a through the lens (TTL) view finder that uses the lenses (23, 25) to form an image in the users eyes, or a micro-display viewfinder in which a micro-display provides an image captured by its respective digital camera and that image is formed on the users eyes using optics. In a typical digital camera, an image sensor such as a charged coupled device (CCD) or a CMOS image sensor is used to capture an image incident on the image sensor and to provide a signal or data stream that is indicative of the image. That signal or data stream can be processed and then displayed on the micro-display viewfinder.

Figure 14A:
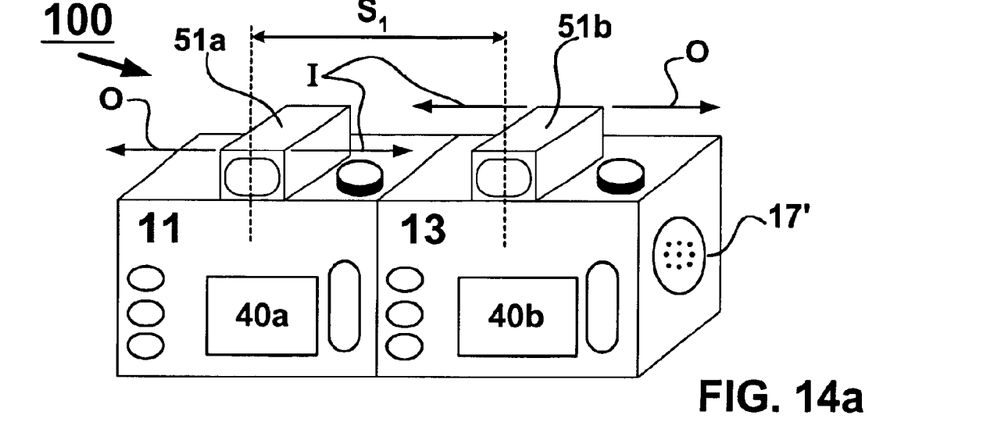
FIGS. 14a and 14b is a rear profile view of linked first and second digital cameras that include movably mounted viewfinders according to the present invention.
Figure 14B:
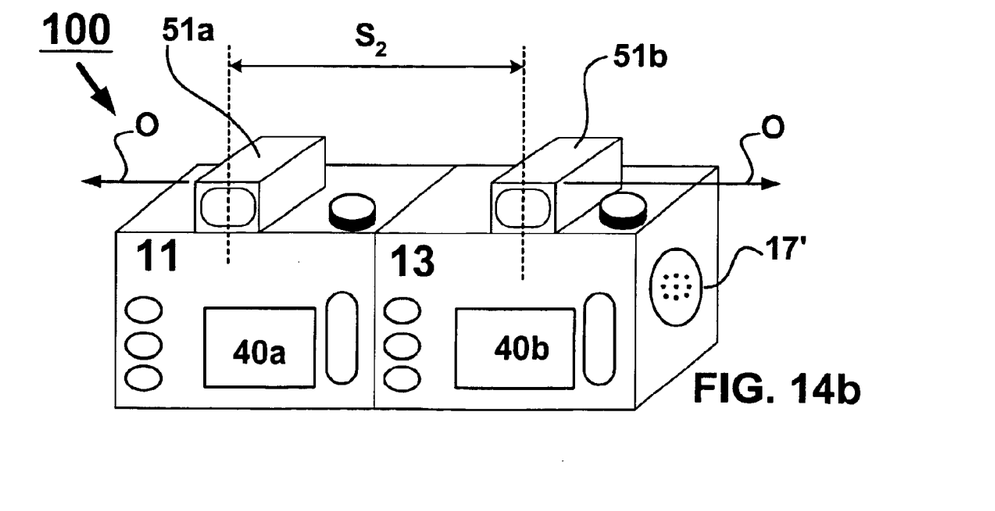

In yet another embodiment of the present invention, the first and second view finders (51*a*, 51*b*) are movably mounted on the first and second digital cameras (11, 13) as illustrated in FIGS. 14*a* and 14*b*. The first and second view finders (51*a*, 51*b*) an be moved inward I or outward O as shown by the arrows in FIG. 14*a*. The movably mounted viewfinders allow for adjustments to the interpupillary separation S to match user specific variations in eye spacing. For instance, in FIG. 14*a*, the first and second view finders (51*a*, 51*b*) can be moved outward O so that an interpupillary separation $S_1$ is increased to an interpupillary separation $S_2$. Conversely, for a user with a smaller eye spacing, the first and second view finders (51*a*, 51*b*) can be moved inward I to decreased to the interpupillary separation from $S_2$ to $S_1$.

The displays 40*a* and 40*b* can also be used to view a stereo image. The predetermined distance D can be adjusted so that the displays 40*a* and 40*b* yield a stereo image of correct disparity when viewed from a normal viewing distance. Adjusting the predetermined distance D has the same effect as changing the interpupillary separation S as described above; however, in this case an interpupillary separation $S_D$ is the distance between the displays 40*a* and 40*b* (see FIG. 4*b*) as measured from the centers of the displays 40*a* and 40*b* as indicated by the ✱ (a reference point other than the centers of the displays 40*a* and 40*b* can be selected to measure the interpupillary separation SD). The data port connector 30 or the adjustable length data port connector 33 can be used to adjust the predetermined distance D and thereby adjust the interpupillary separation $S_D$. Because interpupillary separation can vary due to race, gender, and age, the interpupillary separation $S_D$ can be within a range from about 18.0 millimeters to about 80.0 millimeters. A nominal value for interpupillary separation $S_D$ is 65.0 millimeters. It is commonly misunderstood that adjusting the interpupillary separation $S_D$ is the only way to adapt the displays 40*a* and 40*b* to different user eye spacings. Because the displays 40*a* and 40*b* will most likely be an LCD display or the like, the size of the displays 40*a* and 40*b* can inherently allow for a wide variation in eye spacing that will still allow for stereo image viewing. Therefore, the interpupillary separation $S_D$ can be varied and/or the size of the 40*a* and 40*b* can be large enough to accommodate a wide variation in eye spacing. More information about interpupillary separation can be found in "The World of 3-D" Second Edition, 1987, by Jac. G. Ferwerda, 3-D Book Productions.

When the first and second digital cameras (11, 13) are linked with each other it may be desirable for a user of the system 100 to control some or all of the functions of the first and second digital cameras (11, 13) from either one of the cameras. It may also be desirable for the image captured by a digital camera borrowed by the users to be transferred to the users camera after the first and second images have been captured. Accordingly, in one embodiment of the present invention, either one of the first and second digital cameras (11, 13) is selectable to be a master camera. The other one of the first and second digital cameras (11, 13) is a slave camera and after the first and second images have been captured, the image captured by the slave camera is intercommunicated (transferred) to the master camera. As a result, both the first and second digital images reside in the master camera (i.e. the users camera). Any one of the control buttons or functions displayed by the GUI (see FIG. 3) can be used to select the master camera. For instance in FIG. 5*b*, when the first and second digital cameras (11, 13) are linked with each other, a user could select the second digital camera 13 to be the master camera by pressing the control button 47*b*. For a left-handed user, selecting the second digital camera 13 to be the master camera would be a logical choice. On the other hand, pressing the control button 47*a* on the first digital camera 11 would select the first digital camera 11 to be the master camera. Selecting the first digital camera 11 to be the master camera might be preferable for a right-handed user.

In another embodiment of the present invention, once the user has selected the master camera, some or all of the functions on the master camera that are duplicated on the slave camera can be controlled from the master camera (i.e. an identical function on the slave camera is controlled by the master camera). For example, in order to capture the first and second images, the shutter buttons of the first and second digital cameras (11, 13) must be pressed. Preferably, the shutter buttons are pressed nearly simultaneously; however, it would be difficult for the user to press both shutter buttons nearly simultaneously. Therefore, pressing the shutter button on the master camera would control activation of the shutter on the slave camera. Other camera functions including flash synchronization, focus, and zoom, to name a few, could also be controlled by the master camera.

Referring again to FIG. 5*b*, if the second digital camera 13 is selected to be the master camera, then the first and second images can be captured by pressing the shutter button 49*b* on the second digital camera 13. Moreover, the proper illumination of a scene to be captured may require the use of either one or both of the strobes (24*a* and 24*b* of FIG. 1). The master camera can determine if one or both of the strobes should be fired and synchronize the firing of the strobes (24*a* and 24*b*). Additionally, the button 47*b* can be a zoom control button. When the cameras are linked and the second digital camera 13 is designated as the master camera, using the zoom control button 47*b* can cause the lens 23 on the first digital camera 11 to zoom in or zoom out in synchronization with the lens 25 on the second digital camera 13. Moreover, additional functions that can be controlled by the master camera include light metering, image/file transfer, setting of date and time information, receiving extrinsic data as described above, just to name a few.

An operating system (OS) specifically designed for use in digital cameras can be used to control the first and second digital cameras (11, 13) when they are linked or unlinked. The OS can be customized to support the digital camera functions described herein. For instance, the DIGITA™ OS by FlashPoint Technology Inc., can be customized to perform the above mentioned controls and functions.

Moreover, the electrical and wireless intercommunication of the data between the first and second digital cameras (11, 13) and/or a peripheral can also be driven by the OS. Finally, the GUI can also be a customized product such as the DIGITA™ OE by FlashPoint Technology Inc. The GUI will allow a user of the first and second digital cameras (11, 13) to control either one or both of the cameras using a straight forward and intuitive interface that includes the activation of buttons, selection of the master camera, and the selection of camera functions via icons/menus on the displays 40a and 40b. A designer of the system 100 can use a programming language or a software developer kit such as the DigitaScript or the Digita Application Software Developer Kit (SDK) (both by FlashPoint Technology Inc.) to create customized applications for the OS and the GUI.

Although several embodiments of the present invention have been disclosed and illustrated, the invention is not limited to the specific forms or arrangements of parts so described and illustrated. The invention is only limited by the claims.

What is claimed is:

1. A stereo image capture system, comprising:
    a first digital camera adapted for hand-held use by a user as a stand-alone digital camera and operative to capture a first digital image and including a first optical axis and a first data port;
    a second digital camera adapted for hand-held use by a user as a stand-alone digital camera and operative to capture a second digital image and including a second optical axis and a second data port,
    the first and second data ports are adapted to intercommunicate data including the first and second digital images between the cameras,
    the first and second digital cameras are adapted to be connected with each other so that the first and second optical axes are coplanar and parallel to each other and are separated by a predetermined distance, and
    wherein when the cameras are connected with each other, the cameras form the stereo image capture system operative to capture a stereo image by capturing the first and second digital images.

2. The stereo image capture system of claim 1, wherein the data is intercommunicated between the first and second data ports when the first digital camera is connected with the second digital camera.

3. The stereo image capture system of claim 1 and further comprising a data port connector for connecting the cameras with each other and for connecting the first data port with the second data port.

4. The stereo image capture system of claim 3, wherein the data port connector has a fixed length and the predetermined distance is varied by selecting the fixed length of the data port connector.

5. The stereo image capture system of claim 1 and further comprising a data port connector for connecting the cameras with each other and for connecting the first data port with the second data port and including an adjustable length and the predetermined distance is varied by adjusting the length of the data port connector.

6. The stereo image capture system of claim 5, wherein the predetermined distance can be varied in a range from about 18.0 millimeters to about 80.0 millimeters.

7. The stereo image capture system of claim 1, wherein the predetermined distance is in a range from about 18.0 millimeters to about 80.0 millimeters.

8. The stereo image capture system of claim 1, wherein when the first and second digital cameras are connected with each other the first and second data ports are in electrical intercommunication with each other.

9. The stereo image capture system of claim 8, wherein the data is electrically intercommunicated using a communication protocol.

10. The stereo image capture system of claim 9, wherein the communication protocol is selected from the group consisting of a JETSEND protocol, an IEEE 1394 protocol, a FIREWIRE protocol, an USB protocol, a RS-232 protocol, and a RS422 protocol.

11. The stereo image capture system of claim 1, wherein the first and second data ports are in wireless intercommunication with each other when the first and second digital cameras are connected with each other.

12. The stereo image capture system of claim 11, wherein the wireless intercommunication is a selected one of optical intercommunication and radio intercommunication.

13. The stereo image capture system of claim 12, wherein the optical intercommunication is effectuated using a selected one of an IRDA communication protocol and a JETSEND communication protocol, and the radio intercommunication is effectuated using a BLUETOOTH communication protocol.

14. The stereo image capture system of claim 12, wherein either one or both of the first and second data ports is adapted to receive extrinsic data transmitted from a source external to either one of the first and second digital cameras.

15. The stereo image capture system of claim 14, wherein the extrinsic data comprises illumination data.

16. The stereo image capture system of claim 1 and further comprising:
    a first view finder mounted on the first digital camera; and
    a second view finder mounted on the second digital camera,
    the first and second view finders are spaced apart by an interpupillary separation when the cameras are connected with each other, and
    wherein the first and second view finders are adapted to form a visual stereo image that is representative of the stereo image captured by the first and second digital cameras.

17. The stereo image capture system of claim 16, wherein the first and second view finders are a component selected from the group consisting of an optical view finder, a through-the-lens optical view finder, and a micro-display view finder.

18. The stereo image capture system of claim 16, wherein the first and second view finders are movably mounted to the first and second digital cameras respectively so that the interpupillary separation between the first and second view finders can be adjusted to match a user specific variation in eye spacing.

19. The stereo image capture system of claim 1, wherein one of the first and second digital cameras is selectable to be a master camera and the other one of the first and second digital cameras is a slave camera, and after the first and second digital images have been captured, the digital image captured by the slave camera is intercommunicated to the master camera so that the stereo image resides in the master camera.

20. The stereo image capture system of claim 19, wherein one or more identical functions on the slave camera including the capturing of the second image is controlled by the master camera.

21. The stereo image capture system of claim 1, wherein the second digital camera is flipped from a normal position to a linked position so that the second digital camera can be connected to the first digital camera and so that the second data port is in communication with the first data port when the cameras are connected to each other.

22. The stereo image capture system of claim 1, wherein the first data port is replicated at least once on the first digital camera and the second data port is replicated at least once on the second digital camera so that the first and second digital cameras can be connected with each other without having to flip either one of the cameras in order to effectuate communication between the first and second data ports.

23. The stereo image capture system of claim 1 and further comprising:
 a first display positioned on the first digital camera and operative to display information including the first digital image; and
 a second display positioned on the second digital camera and operative to display information including the second digital image, wherein the predetermined distance defines an interpupillay separation between the first and second displays such that a user of the stereo image capture system can view the stereo image.

24. The stereo image capture system of claim 23, wherein the predetermined distance can be varied in a range from about 18.0 millimeters to about 80.0 millimeters so that the interpupillay separation can be adjusted to match a user specific variation in ey e spacing.

* * * * *